US009779220B1

(12) United States Patent
Kronrod et al.

(10) Patent No.: US 9,779,220 B1
(45) Date of Patent: Oct. 3, 2017

(54) OBSCURING DATA USING ON-THE-FLY RETOKENIZABLE TOKENS

(71) Applicant: EMC Corporation, Hopkinton, MA (US)

(72) Inventors: Boris Kronrod, Netanya (IL); Shadi Ibrahim, Netanya (IL); Oleg Freylafert, Hod Hasharon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 445 days.

(21) Appl. No.: 13/630,229

(22) Filed: Sep. 28, 2012

(51) Int. Cl.
*G06F 21/00* (2013.01)
*G06F 12/14* (2006.01)
*G06F 21/10* (2013.01)
*H04L 9/08* (2006.01)
*H04L 29/06* (2006.01)

(52) U.S. Cl.
CPC ............ *G06F 21/10* (2013.01); *G06F 12/14* (2013.01); *G06F 2221/2107* (2013.01); *H04L 9/08* (2013.01); *H04L 63/0428* (2013.01)

(58) Field of Classification Search
CPC ................................................ G06F 17/30504
See application file for complete search history.

(56) References Cited

U.S. PATENT DOCUMENTS

| 5,454,108 | A * | 9/1995 | Devarakonda | G06F 9/526 710/200 |
| 6,523,041 | B1 * | 2/2003 | Morgan | G06Q 30/02 |
| 6,889,325 | B1 * | 5/2005 | Sipman et al. | 713/176 |
| 7,555,493 | B2 * | 6/2009 | Khayter | G06F 17/30286 |
| 7,707,138 | B2 * | 4/2010 | Dawson | G06F 17/30306 707/999.002 |
| 8,353,032 | B1 * | 1/2013 | Satish | H04L 63/1483 726/22 |
| 8,452,965 | B1 | 5/2013 | Griffin et al. | |
| 8,458,487 | B1 * | 6/2013 | Palgon et al. | 713/185 |
| 8,595,812 | B2 * | 11/2013 | Bomar | G06F 21/335 713/172 |
| 8,655,787 | B1 * | 2/2014 | Griffin | G06Q 20/00 705/50 |

(Continued)

OTHER PUBLICATIONS

Griffin et al., "Techniques of Imposing Access Control Policies," U.S. Appl. No. 12/826,481, filed Jun. 29, 2010.

(Continued)

*Primary Examiner* — John B King
*Assistant Examiner* — Darshan Dhruv
(74) *Attorney, Agent, or Firm* — BainwoodHuang

(57) ABSTRACT

A method includes (a) selecting a first token column or a second token column of a token table as an active token column based upon the value of a current token flag, (b) selecting a row of the token table uniquely associated with a sensitive piece of data, the selected row having a first token field storing a first token value and a second token field storing a second token value, (c) selectively extracting an active token value from the first token field when the first token column is the active token column and from the second token field when the second token column is the active token column, (d) selecting a row of a data table having the extracted active token value within a token field, and (e) causing contents of the selected row of the data table to be displayed to a user over a user interface.

18 Claims, 8 Drawing Sheets

(56) References Cited

U.S. PATENT DOCUMENTS

| | | | |
|---|---|---|---|
| 8,978,152 B1* | 3/2015 | Rozenberg | H04L 63/0428 726/26 |
| 9,419,841 B1* | 8/2016 | Kozolchyk | H04L 9/3239 |
| 2002/0029220 A1* | 3/2002 | Oyanagi | G06F 17/10 |
| 2007/0226218 A1* | 9/2007 | Chatterjee | G06F 9/466 |
| 2008/0294697 A1* | 11/2008 | Andrasak | G06F 17/30309 |
| 2010/0088281 A1* | 4/2010 | Driesen | G06F 8/65 707/641 |
| 2010/0202608 A1* | 8/2010 | Furuhashi | H04L 9/0894 380/44 |
| 2011/0264650 A1* | 10/2011 | Tobin | G06F 17/30554 707/722 |
| 2012/0173563 A1 | 7/2012 | Griffin et al. | |
| 2012/0304273 A1* | 11/2012 | Bailey | H04L 9/0891 726/9 |
| 2013/0103685 A1* | 4/2013 | Preneel et al. | 707/736 |
| 2013/0198851 A1* | 8/2013 | Spies | H04L 9/0625 726/26 |
| 2013/0346688 A1* | 12/2013 | Hayakawa | G06F 3/0611 711/113 |

OTHER PUBLICATIONS

Griffin et al., "Automated Detection of Defined Input Values and Transformation to Tokens," U.S. Appl. No. 12/826,491, filed Jun. 29, 2010.

* cited by examiner

Fig. 3

| Data Table 38 | | | | |
|---|---|---|---|---|
| First Token (70) | Second Token (72) | Non-Sensitive Data (74) | First Token Version (76) | Second Token Version (78) |
| $T_1$ | $U_1$ | | 1 | 2 |
| $T_2$ | $U_2$ | | 1 | 2 |
| $T_3$ | $U_3$ | | 1 | 2 |
| $T_1$ | $U_1$ | | 1 | 2 |
| $T_4$ | $U_4$ | | 1 | 2 |
| $T_3$ | $U_3$ | | 1 | 2 |
| $T_2$ | $U_2$ | | 1 | 2 |
| $T_1$ | $U_1$ | | 1 | 2 |
| $T_5$ | $U_5$ | | 1 | 2 |
| ⋮ | ⋮ | 74(a)  74(b)  74(c) | ⋮ | ⋮ |

Fig. 4

| Sensitive Data | First Token | Second Token | First Token Version | Second Token Version |
|---|---|---|---|---|
| ↑ 102 | ↑ 104 | ↑ 106 | ↑ 108 | ↑ 110 |
| $D_1$ | $T_1$ | $U_1$ | 1 | 2 |
| $D_2$ | $T_2$ | $U_2$ | 1 | 2 |
| $D_3$ | $T_3$ | $U_3$ | 1 | 2 |
| $D_4$ | $T_4$ | $U_4$ | 1 | 2 |
| $D_5$ | $T_5$ | $U_5$ | 1 | 2 |
| ⋮ | ⋮ | ⋮ | ⋮ | ⋮ |

Token Table 148

Fig. 5

| 212 | 213 | 214 | 216 | 218 | 204 | 206 | 208 | 210 |
|---|---|---|---|---|---|---|---|---|
| | | | | Token Table 148 | | | | |
| $1^{st}$ Enc. Val. | $2^{nd}$ Enc. Val. | Field Type | First Key Version | Second Key Version | First Token | Second Token | First Token Version | Second Token Version |
| $E_1$ | $F_1$ | Username | 1 | 2 | $T_1$ | $U_1$ | 1 | 2 |
| $E_2$ | $F_2$ | Username | 1 | 2 | $T_2$ | $U_2$ | 1 | 2 |
| $E_3$ | $F_3$ | Username | 1 | 2 | $T_3$ | $U_3$ | 1 | 2 |
| $E_4$ | $F_4$ | Username | 1 | 2 | $T_4$ | $U_4$ | 1 | 2 |
| $E_5$ | $F_5$ | Username | 1 | 2 | $T_5$ | $U_5$ | 1 | 2 |
| ⋮ | ⋮ | ⋮ | ⋮ | ⋮ | ⋮ | ⋮ | ⋮ | ⋮ |

OBSCURING DATA USING ON-THE-FLY RETOKENIZABLE TOKENS

BACKGROUND

Databases that store customer information are often partially encrypted or obscured in order to increase customer security. In particular, databases that repetitively store certain kinds of information often use tokens to replace one or more fields of the database.

SUMMARY

The above-described approach may suffer from deficiencies. For example, in the conventional approach, large tokenized databases may suffer from compromised security. After a certain amount of time, the tokens used in a database may become compromised. Therefore, it becomes necessary to periodically change the token to data mapping. This process typically requires taking the database offline while the fields are updated. For large databases, the downtime required to update the tokenized fields may become unacceptable.

Thus, it would be desirable to design a database that allows repetitive sensitive data to be obscured with tokens in such a way that the tokens may be updated without requiring any system downtime. Embodiments of the invention are directed to techniques for obscuring databases using two token fields, thereby allowing one inactive token field to be updated while an active token field remains available. An active token flag may be used to indicate which token column is active, allowing a database application to update the other column as processing time permits. In some embodiments, a token version field is also used to allow the database application to keep track of which rows of the database have already been updated.

One embodiment is directed to a method performed by a computer is described. The method includes (a) selecting a first token column of a token table or a second token column of the token table as an active token column based upon the value of a current token flag stored in memory of the computer, (b) selecting a row of the token table uniquely associated with a sensitive piece of data, the selected row having a first token field within the first token column storing a first random token value and a second token field within the second token column storing a second random token value, (c) selectively extracting an active token value from the first token field when the first token column is the selected active token column and from the second token field when the second token column is the selected active token column, (d) selecting a row of a data table having the extracted active token value within a token field, the data table being distinct from the token table, and (e) causing contents of the selected row of the data table to be displayed to a user over a user interface. A corresponding apparatus and computer program product are also described.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 depicts an example data structure for use in performing various embodiments.

FIG. 4 depicts an example data structure for use in performing various embodiments.

FIG. 5 depicts an example data structure for use in performing various embodiments.

DETAILED DESCRIPTION

Embodiments of the invention are directed to techniques for obscuring databases using two token fields, thereby allowing one inactive token field to be updated while an active token field remains available. An active token flag may be used to indicate which token column is active, allowing a database application to update the other column as processing time permits. In some embodiments, a token version field is also used to allow the database application to keep track of which rows of the database have already been updated.

Figure 1:
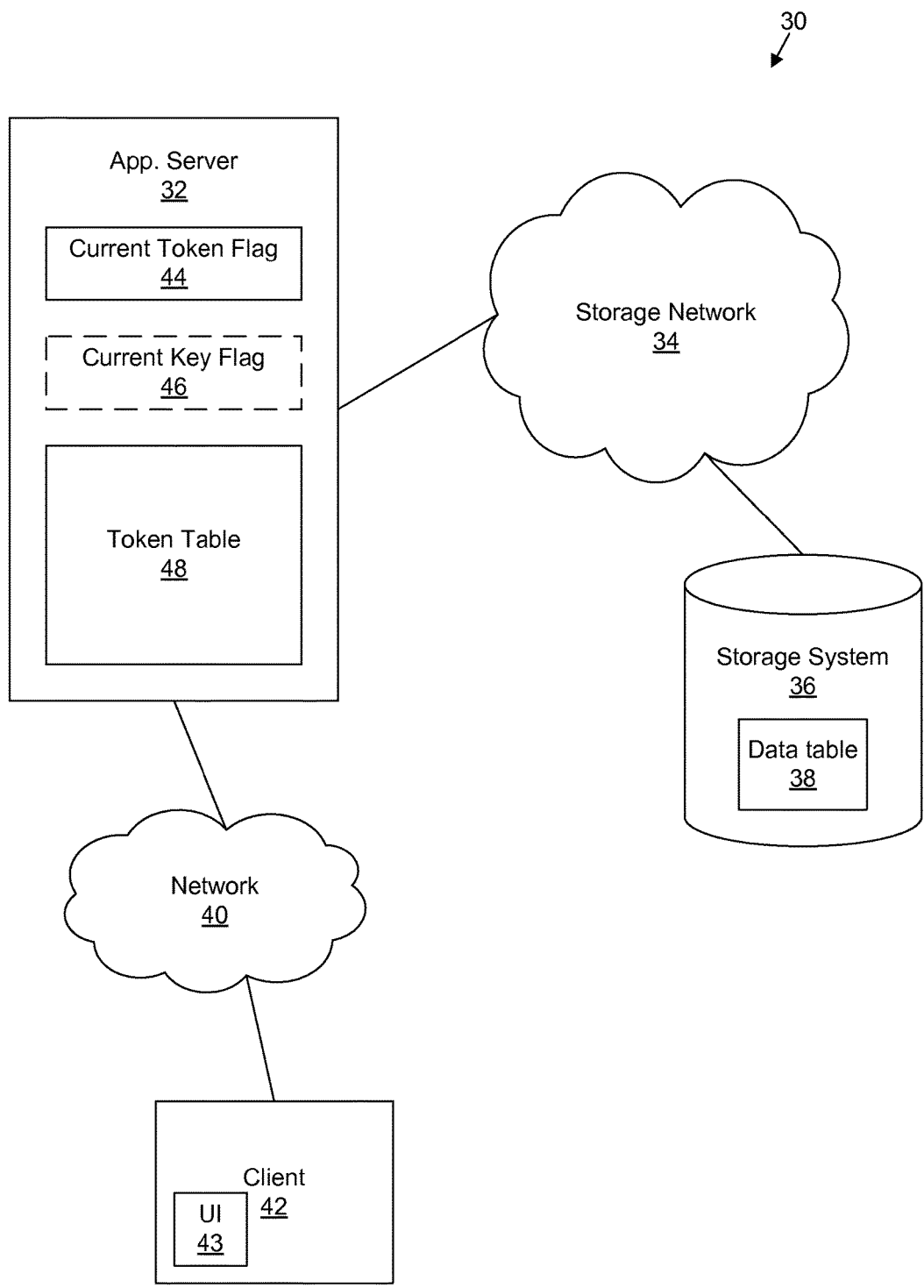
FIG. 1 depicts an example system for use in performing various embodiments.

FIG. 1 depicts an example system 30 for use in performing various embodiments.

System 30 includes an application server 32 which connects to a storage system 36 via a storage network 34. Storage network 34 may be any kind of network for connecting a host computer to storage, such as, for example, a storage area network, a local area network, a wide area network, network attached storage, a fabric of interconnected hubs and switches, etc. In some embodiments, in lieu of a storage network, a direct connection to the storage may be used, such as, for example, using a SCSI, Fibre Channel, or ATA bus. Storage system 36 may be any kind of system used to provide storage, such as, for example, a Symmetrix, VMax series, VNX series, or VNXe series storage system produced by the EMC Corp. of Hopkinton, Mass. Storage system 36 stores a data table 38 that includes sensitive data obscured using tokens.

Application server 32 may also connect to one or more clients 42 via a network 40. Network 40 may be any kind of network, such as, for example, a local area network, a wide area network, network attached storage, a fabric of interconnected hubs and switches, etc. In some embodiments, in lieu of a network, a direct point-to-point connection to the client 42 may be used. In some embodiments (not depicted), network 40 and storage network 42 may be the same network, while in others, separate networks may be used, as depicted. Client 42 may be any kind of computing device that allows a user to interact with a database application of the application server via a user interface 43. Client 42 may be any kind of computing device, such as, for example, a personal computer, a workstation, a server, an enterprise server, a laptop computer, a mobile computer, a smart phone, a tablet computer, etc.

Application server 32 stores a current token flag 44 for indicating which of two token fields of data table 38 is considered to be active at any given time. Application server 32 also stores a token table 48, which stores a mapping between the repetitive sensitive data elements of the data table 38 and the two token fields. In some embodiments, token table 48 stores the sensitive data in encrypted form using two encryption keys to store two distinct encrypted values for each sensitive data element. In these embodiments, application server 32 also stores a current key flag 46 which indicates which of two key fields (and which or two encrypted value fields) of the token table 48 is active at any given time.

Figure 2:
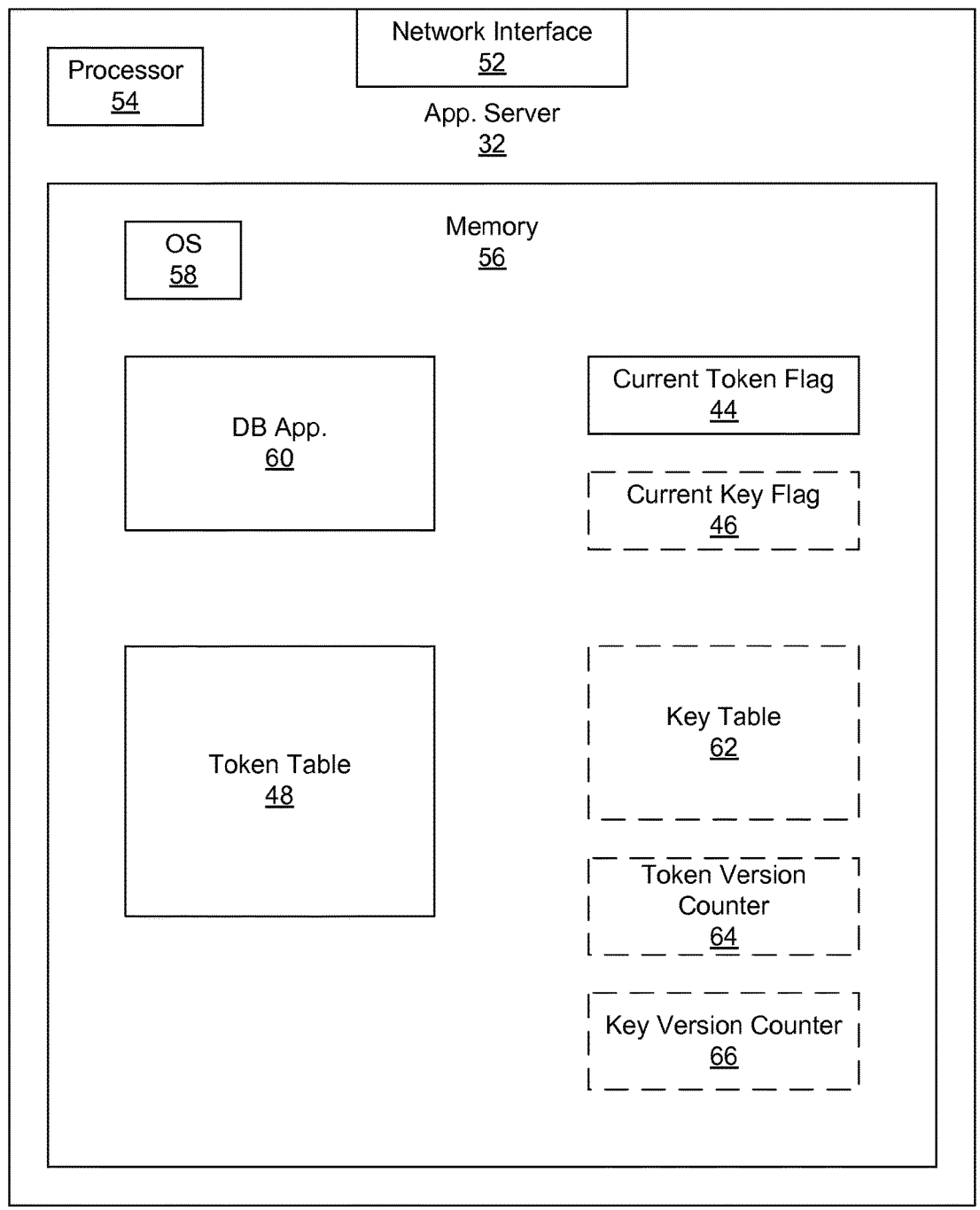
FIG. 2 depicts an example apparatus of various embodiments.

Further detail with respect to an example application server 32 is provided in FIG. 2. Application server 32 may be any kind of computing device, such as, for example, a personal computer, a workstation, a server, an enterprise server, a laptop computer, a mobile computer, a smart phone, a tablet computer, etc. Typically, application server 32 will be a server or an enterprise server. Application server 32 includes one or more network interfaces 52 for connecting to storage network 34 and network 40, a processor 54, and memory 56.

Processor 54 may be any kind of processor configured to perform operations, such as, for example, a microprocessor, a multi-core microprocessor, a digital signal processor, a collection of electronic circuits, or one or more of the above. Memory 56 may be any kind of digital memory, such as, for example, random access memory, read-only memory, static memory, volatile memory, non-volatile memory, system memory, solid-state storage, disk-based storage, or some combination of the above. Memory 56 stores programs executing on processor 54 as well as data used by those programs. Memory 56 stores an operating system 58, a database application (DB app) 60, token table 48, and current token flag 44. In some embodiments, memory 56 also stores current key flag 46, a key table 62, a token version counter, 64, and a key version counter 66. Memory 56 may include a non-volatile storage portion (e.g., file-based hard disk storage) as well as a volatile system memory portion (e.g., random access memory). DB app 60, when running, is stored in volatile system memory portion of memory 56. DB app 60 may also be stored in non-volatile storage portion of memory 56 to allow it to persist and be re-loaded upon system restarts. The volatile system memory portion of memory 56 storing DB app 60 forms a computer program product. Similarly, the volatile system memory portion of memory 56 storing DB app 60 forms a computer program product.

FIG. 3 depicts an example data table 38 stored on storage system 36 in further detail. Data table 38 includes a plurality of columns 70, 72, 74, and, in some embodiments, additional columns 76, 78. First token column 70 stores, in each row, a first token associated with a piece of sensitive data, while second token column 72 stores a second token associated with the same piece of sensitive data in that row. Non-sensitive data column 74 may actually include several columns (depicted as non-sensitive data columns 74(a), 74(b), and 74(c) of data which is not tokenized.

TABLE 1

Example data

| Username | Login time | Time logged in | IP address |
| --- | --- | --- | --- |
| jsmith | Jan. 1, 2011 02:00:00 | 00:00:05 | 123.123.123.123 |
| jdoe | Jan. 1, 2011 02:01:30 | 00:17:30 | 111.111.111.111 |
| msmith | Jan. 1, 2011 02:01:40 | 00:59:07 | 123.123.123.123 |
| jsmith | Jan. 1, 2011 23:00:00 | 00:00:12 | 123.123.123.123 |
| janet111 | Jan. 1, 2011 23:05:27 | 14:07:03 | 99.99.99.99 |
| msmith | Jan. 2, 2011 00:05:00 | 01:11:50 | 15.15.15.15 |
| jdoe | Jan. 2, 2011 02:07:00 | 00:15:03 | 200.200.200.200 |

TABLE 1-continued

Example data

| Username | Login time | Time logged in | IP address |
| --- | --- | --- | --- |
| jsmith | Jan. 2, 2011 02:09:10 | 22:23:27 | 50.50.50.50 |
| guest1 | Jan. 2, 2011 02:25:43 | 00:19:00 | 1.2.3.4 |

Table 1 depicts example data which database application 60 may desire to keep track of Table 1 may represent a series of login events to a computer system. Assuming that the username column is considered to be sensitive, the username column may be tokenized into token columns 70, 72. Thus, username jsmith may be represented by first token $T_1$ and second token $U_1$ (where $T_1$ and $U_1$ represent random tokens), while username jdoe is represented by first token $T_2$ and second token $U_2$, etc. Thus, since username jsmith appears in Table 1 three times, first token $T_1$ appears in first token column 70 three times and second token $U_1$ appears in second token column 72 three times. The login time, time logged in, and IP address may be considered non-sensitive data, and these columns from Table 1 may appear in the data table 38 as non-sensitive data columns 74(a), 74(b), 74(c), respectively. In some embodiments, non-sensitive data columns 74 may be encrypted or tokenized as well, but typically using a low-level low-overhead encryption or tokens that do not require periodic replacement.

In some embodiments, data table 38 also includes a first token version column 76 and a second token version column 78. As depicted in FIG. 3, all of the tokens $T_x$ in the first token column 70 have a token version of 1, while all of the tokens $U_x$ in the second token column 72 have a token version of 2. As the token values of the inactive token column 70, 72 are updated, the token version values of the corresponding token version column 76, 78 are also updated (e.g., transitioning from version 1 to version 3). This procedure will be described in further detail below.

FIG. 4 depicts an example token table 148 stored on application server 32 according to several embodiments in further detail. Token table 148 includes a plurality of columns 102, 104, 106, 108, 110. In some embodiments, sensitive data column 102 stores pieces of sensitive data (e.g., $D_1$ would be jsmith, $D_2$ would be jdoe, etc.), while in other embodiments sensitive data column 102 stores encrypted versions of the pieces of sensitive data. First token column 104 stores, in each row, a first token $T_x$ associated with a piece of sensitive data, while second token column 106 stores a second token associated $U_x$ with the same piece of sensitive data in that row. First token version column 108 stores the version of the token $T_x$ from the first token column 104 in the same row, while second token version column 110 stores the version of the token $U_x$ from the second token column 106 in the same row.

FIG. 5 depicts an example enhanced token table 248 stored on application server 32 according to several embodiments in further detail. Token table 248 includes a plurality of columns 204, 206, 208, 210, 212, 213, 214, 216, 218. Columns 204-210 correspond to columns 104-110 and serve a similar purpose. However, instead of a sensitive data column 102, two encrypted value columns 212, 213 are used. First encrypted column 212 stores, in each row, a first encrypted version $E_x$ of the piece of sensitive data associated with that row, while second encrypted column 213 stores, in each row, a second encrypted $F_x$ version of the piece of sensitive data associated with that row. The encryption key used for encrypting and decrypting the first encrypted versions $E_x$ in the first encrypted value column is a key identified by a key version number stored in first key version column 216, while the encryption key used for encrypting and decrypting the second encrypted versions $F_x$ in the second encrypted value column is a key identified by a key version number stored in second key version column 218. The key versions may refer to keys stored in key table 62. Thus, if key table 62 stores mappings {Ver.1: $K_a$, Ver.2: $K_b$, Ver.3: $K_c$, etc.}, then first encrypted value $E_1$ would be given by $E_1$=Encrypt($D_1$, $K_a$) and the first encrypted value $E_2$ would be given by $E_2$=Encrypt($D_2$, $K_a$). Similarly, second encrypted value $F_1$ would be given by $F_1$=Encrypt($D_1$, $K_b$) and second encrypted value $F_2$ would be given by $F_2$=Encrypt($D_2$, $K_b$).

If current key flag 46 starts off referencing first key version column 216, then, if the first key $K_a$ becomes compromised (or upon a periodic update of the keys), then current key flag 46 might be updated to instead reference second key version column 218, allowing the first key column 216 to be updated. Then the first value (first row) of first key version column 216 would be updated to version 3 and the first value (first row) of first encrypted value column 212 would be updated to $G_1$=Encrypt($D_1$, $K_c$). Subsequently the remaining rows would be updated similarly. Once all rows have been updated, the current key flag could be changed back to reference first key version column 216 again.

In some embodiments, enhanced token table 248 also includes a field type column 214. This column 214 stores a column header for the sensitive data element for each row. This may be useful if several different columns of the data table are tokenized.

Figure 6:
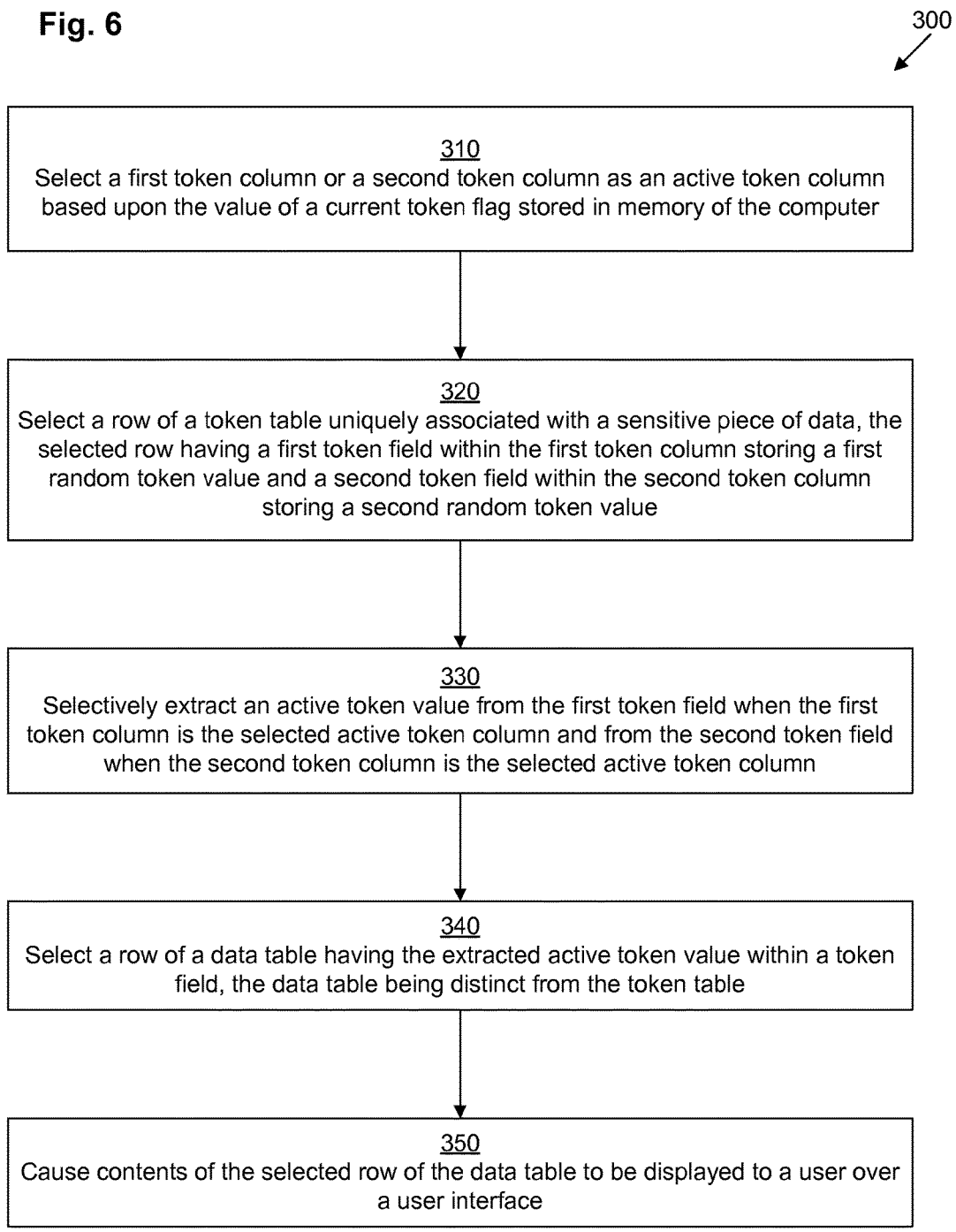
FIG. 6 depicts an example method of various embodiments.
Figure 7:
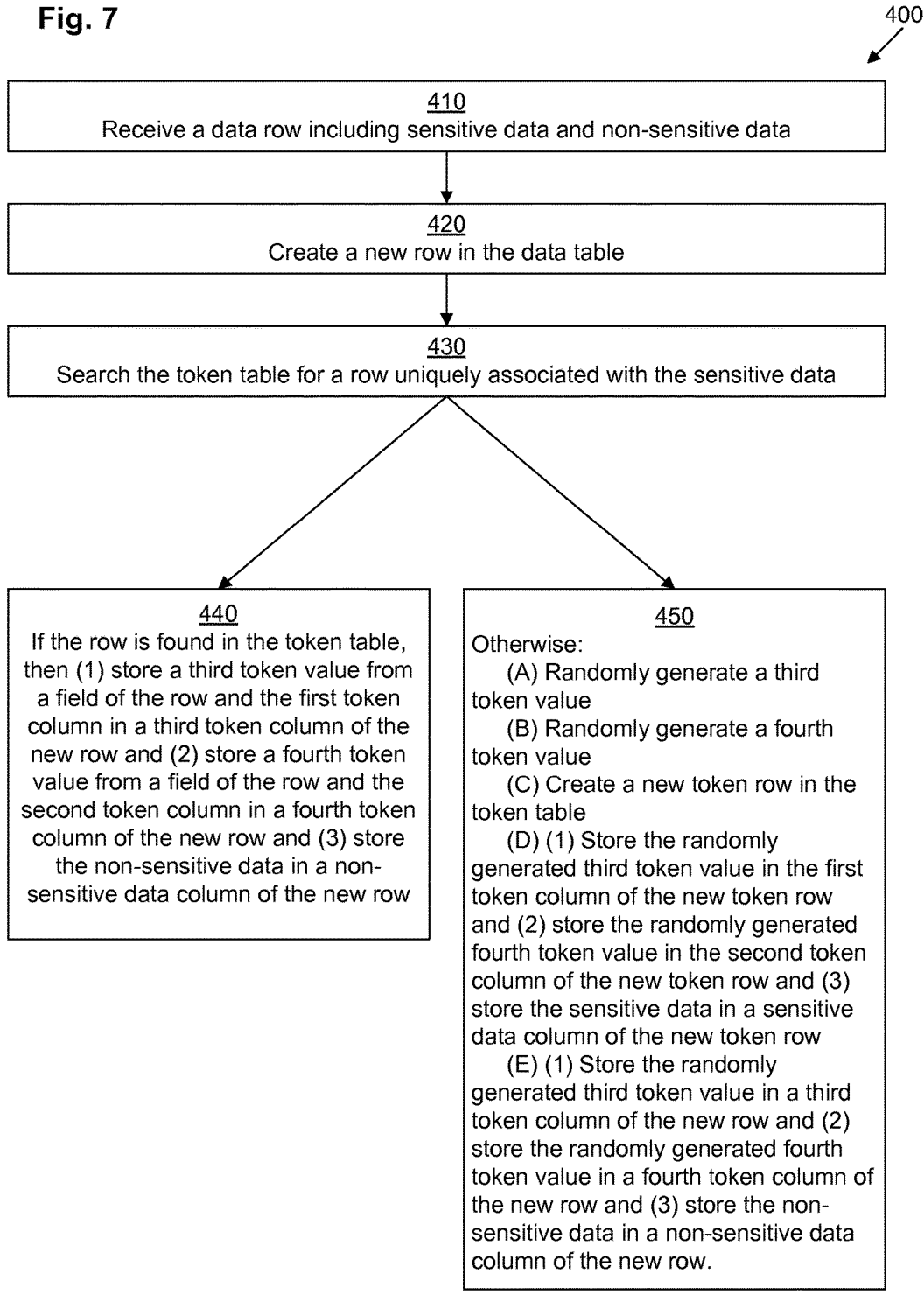
FIG. 7 depicts another example method of various embodiments.
Figure 8:
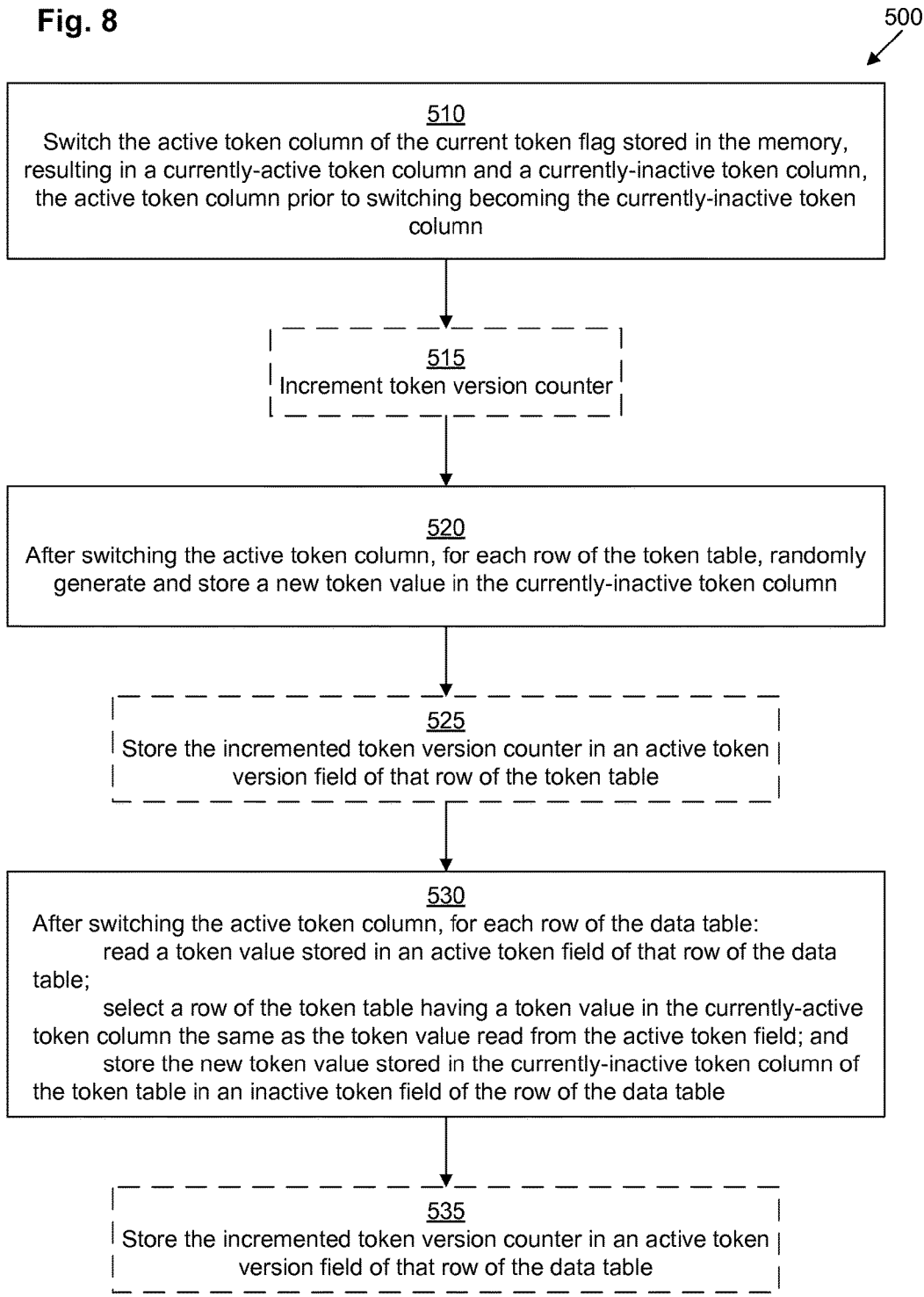
FIG. 8 depicts another example method of various embodiments.

FIGS. 6-8 illustrate the operation of system 30 in detail according to various embodiments. It should be understood that any time a piece of software, such as, for example, DB app 60, is described as performing a method, process, step, or function, in actuality what is meant is that the device on which the piece of software is running (e.g., application server 32 via operation of processor 54) performs the method, process, step, or function when executing that piece of software.

FIG. 6 illustrates, as method 300, the operation of system 30 when a user of client 42 desires to access the data from a row of data table 38.

In step 310, DB app 60 selects a first token column 104, 204 of a token table 48 or a second token column 106, 206 of the token table 48 as an active token column based upon the value of current token flag 44 stored in memory 56. It should be noted that the value of the current token flag 44 is used BOTH to select the active token column within the token table 48 as well as to select the active token column 70, 72 within the data table 38. Current token flag 44 may be a single bit flag, which when set to a value of zero selects first token columns 70, 104, 204 and when set to a value of one selects second token columns 72, 106, 206. In other embodiments, more than two token columns may be used in each of the data table 38 and the token table 48, in which case a multi-bit flag is used instead of a single-bit flag.

In step 320, DB app 60 selects a row of the token table 48 uniquely associated with a sensitive piece of data $D_x$, the selected row having a first token field within the first token column 104, 204 storing a first random token value $T_x$ and a second token field within the second token column 106, 206 storing a second random token value $U_x$. In embodiments in which token table 148 is used, the selected row will be the row that stores the sensitive piece of data $D_x$ in the sensitive data column 102. For example, if the sensitive piece of data $D_x$ is sensitive piece of data $D_1$ (e.g., jsmith), and the current token flag is set to a value of 0, then the first row of token table 148 will be selected.

In embodiments in which the enhanced token table 248 is used, the selected row will be the row that stores an encrypted value $E_1$, $F_1$ that is based on the key having a version number selected by a combination of the current key flag 46 and the version number stored in the appropriate key version column 216, 218. For example, if the sensitive piece of data $D_x$ is sensitive piece of data $D_1$ (e.g., jsmith), and the current token flag is set to a value of 0 and the current key flag is set to a value of 0 (selecting first key version column 216), then the first row of token table 148 will be selected because $E_1$=Encrypt($D_1$, $K_a$).

In step 330 DB app 60 selectively extracts an active token value from the first token field when the first token column 104, 204 is the selected active token column and from the second token field when the second token column 106, 206 is the selected active token column. For example, if the sensitive piece of data $D_x$ is sensitive piece of data $D_1$ (e.g., jsmith), and the current token flag is set to a value of 0, then the extracted active token value will be $T_1$.

In step 340, DB app 60 selects a row of data table 38 having the extracted active token value $T_x$, $U_x$ within a token field. In particular, if the first token column 104, 204 is the selected active token column, then DB app 60 selects a row of the data table 38 which has the extracted active token value $T_x$ within first token column 70, and if the second token column 106, 206 is the selected active token column, then DB app 60 selects a row of the data table 38 which has the extracted active token value $U_x$ within second token column 72. In some instances, more than one row will be selected. For example, if the sensitive piece of data $D_x$ is sensitive piece of data $D_1$, and the current token flag is set to a value of 0, then, since the extracted active token value is $T_1$, DB app 60 will select the first, fourth, and eight rows (or just one of those rows, depending on the embodiment) of the data table 38, since those rows store token $T_1$ within first token column 70.

In step 350, DB app 60 causes contents of the selected row of the data table 38 to be displayed to a user over user interface 43. Thus, if the sensitive piece of data $D_x$ is sensitive piece of data $D_1$, and the current token flag is set to a value of 0, then, since the first, fourth, and eight rows of data table 38 are selected, the following information from Table 2 might be displayed over user interface 43:

TABLE 2

| Example Display | | | |
| --- | --- | --- | --- |
| Username | Login time | Time logged in | IP address |
| jsmith | Jan. 1, 2011 02:00:00 | 00:00:05 | 123.123.123.123 |
| jsmith | Jan. 1, 2011 23:00:00 | 00:00:12 | 123.123.123.123 |
| jsmith | Jan. 2, 2011 02:09:10 | 22:23:27 | 50.50.50.50 |

FIG. 7 illustrates, as method 400, the operation of system 30 when a user of client 42 desires to add a row of data to data table 38.

In step 410, DB app 60 receives a row of data that includes both sensitive data items and non-sensitive data items. An example of a new data row that DB app 60 may receive is shown in Table 3. In the example of Table 3, the new row has sensitive data $D_{new}$=jdoe.

TABLE 3

New Data row

| jdoe | Jan. 2, 2011 12:51:12 | 00:37:44 | 100.123.123.245 |

In step 420, DB app 60 adds a new row to the end of the data table 38.

In step 430, which may be performed in parallel with (or before or after) step 420, DB app 60 searches the token table 48 for a row uniquely associated with the new sensitive data $D_{new}$.

In embodiments in which token table 148 is used, the selected row will be the row that stores the sensitive piece of data $D_{new}$ the sensitive data column 102. For example, if the sensitive piece of data $D_{new}$ is sensitive piece of data $D_2$ (e.g., jdoe), then the second row of token table 148 will be found.

In embodiments in which the enhanced token table 248 is used, the selected row will be the row that stores an encrypted value $E_1$, $F_1$ that is based on the key having a version number selected by a combination of the current key flag 46 and the version number stored in the appropriate key version column 216, 218. For example, if the sensitive piece of data $D_{new}$ is sensitive piece of data $D_2$ (e.g., jdoe) and the current key flag is set to a value of 1 (selecting second key version column 218), then the second row of token table 148 will be selected because $E_2=Encrypt(D_2, K_b)$.

As an additional example, if the sensitive piece of data $D_{new}$ is a sensitive piece of data $D_6$ (e.g., djohnson123) that is not yet stored in the token table 48, then no row of token table 148 will be found. See Table 4, for example.

TABLE 4

New Data row with new sensitive piece of data

| djohnson123 | Jan. 3, 2011 01:41:07 | 01:12:59 | 99.123.123.19 |

In step 440, which is performed if and only if a row is found in step 430, DB app 60 performs three operations: (1) DB app 60 stores the token value $T_x$ from the first token column 104, 204 of the token table 48 in the first token column 70 of the new row in data table 38, (2) DB app 60 stores the token value $U_x$ from the second token column 106, 206 of the token table 48 in the second token column 72 of the new row in data table 38, and (3) DB app 60 stores the non-sensitive data in appropriate columns of the new row of the data table 38.

In the example (see Table 3) in which the sensitive piece of data $D_{new}$ is sensitive piece of data $D_2$ (e.g., jdoe), in step 440, (1) DB app 60 stores the token value $T_2$ from the first token column 104, 204 of the token table 48 in the first token column 70 of the new row in data table 38, (2) DB app 60 stores the token value $U_2$ from the second token column 106, 206 of the token table 48 in the second token column 72 of the new row in data table 38, and (3) DB app 60 stores the non-sensitive data in appropriate columns of the new row of the data table 38, e.g., "1/2/2011 12:51:12" in column 74(a), "00:37:44" in column 74(b), and "100.123.123.245" in column 74(c).

In step 450, which is performed if and only if a row is not found in step 430, DB app 60 performs several operations: (A) DB app 60 randomly generates a new token $T_{new}$, (B) DB app 60 randomly generates a new token $U_{new}$, (C) DB app 60 adds a new row to the end of the token table 48, (D) (1) DB app 60 stores new token $T_n$, in the first token column 104, 204 of the new row in token table 48, (2) DB app 60 stores new token $U_{new}$ in the second token column 106, 206 of the new row in token table 48, and (3) DB app 60 stores the sensitive data $D_{new}$ in the field at the sensitive data column 102 of the new row in token table 148 OR DB app 60 stores encrypted versions $E_{new}$, $F_{new}$ of the sensitive data $D_{new}$ respectively in the fields at the encrypted value columns 212, 213 of the new row in token table 248, and (E) (1) DB app 60 stores new token $T_{new}$ in the first token column 70 of the new row in data table 38, (2) DB app 60 stores new token $U_{new}$ in the second token column 72 of the new row in data table 38, and (3) DB app 60 stores the non-sensitive data in appropriate columns of the new row of the data table 38.

In the example (see Table 4) in which the sensitive piece of data $D_{new}$ is sensitive piece of data $D_6$ (e.g., djohnson123), in step 450, (A) DB app 60 randomly generates a new token $T_6$, (B) DB app 60 randomly generates a new token $U_6$, (C) DB app 60 adds a new sixth row to the end of the token table 48, (D) (1) DB app 60 stores new token $T_6$ in the first token column 104, 204 of the new sixth row in token table 48, (2) DB app 60 stores new token $U_6$ in the second token column 106, 206 of the new sixth row in token table 48, and (3) DB app 60 stores the sensitive data $D_6$ in the field at the sensitive data column 102 of the new sixth row in token table 148 OR DB app 60 stores encrypted versions $E_6$, $F_6$ of the sensitive data $D_6$ respectively in the fields at the encrypted value columns 212, 213 of the new sixth row in token table 248, and (E) (1) DB app 60 stores new token $T_6$ in the first token column 70 of the new row in data table 38, (2) DB app 60 stores new token $U_6$ in the second token column 72 of the new row in data table 38, and (3) DB app 60 stores the non-sensitive data in appropriate columns of the new row of the data table 38, e.g., "1/3/2011 01:41:07" in column 74(a), "01:12:59" in column 74(b), and "99.123.123.19" in column 74(c).

FIG. 8 illustrates, as method 500, the operation of system 30 when it is time to re-tokenize data table 38. This re-tokenization may be done either on a periodic basis (e.g., once a week, once a month, once every 6 months, etc.) in order to preserve data security in case of an unknown breach, or it may be initiated by a system administrator in response to information about a specific breach of security.

In step 510, DB app 60 switches the active token column of the current token flag 44, resulting in a currently-active token column and a currently-inactive token column, the active token column prior to switching becoming the currently-inactive token column. Thus, for example, if the current token flag 44 is initially set to a value of zero, indicating that the active token column is initially the first token column 104, 204 and the inactive token column is initially the second token column 106, 206 then, upon DB app 60 switching the current token flag 44 to have a value of one, the second token column 106, 206 becomes the currently-active token column and the first token column 104, 204 becomes the currently-inactive token column.

In step 515, which may be performed in some embodiments, DB app 60 increments the token version counter 64 upon switching the value of the current token flag 44. Typically this incrementing will be done by adding two to the current value. Thus, if the tokens $T_x$ of the initially-active first token column 204 initially have a version value (in first token version column 208) of 1, and the tokens $U_x$ of the initially-inactive second token column 206 initially have a version value (in second token version column 210) of 2, then the token version counter 64 may be initially set to 1, but upon switching the value of the current token flag 44, the token version counter 64 may be incremented to a value of 3, since the currently-inactive first token column 204 is about to be switched to a new, unused set of tokens, namely version 3.

In step 520, after switching the active token column, for each row of the token table 48, DB app 60 randomly generates and stores a new token value in the currently-inactive token column. Thus, if the currently-inactive token column is the first token column 104, 204 (with associated token version 1), then DB app 60 randomly generates a new token, e.g., $V_x$ to replace the previous version 1 token $T_x$ in the currently-inactive first token column 104, 204. In step 525, the token version column 108, 208 or 110, 210 associated with the currently-inactive token column (e.g., first token version column 108, 208 in the case of currently-inactive first token column 104, 204) is updated to store the value from the token version counter 64 (e.g., version 3) to reflect the version of the new token.

In step 530, after switching the active token column and after performing step 520 (at least for the relevant row of the token table 48), for each row of the data table 38, DB app 60 stores the new token value created for the corresponding row of the token table 48 in the currently-inactive token column of the data table 38. This may be done by reading the token from the currently-active token column of the data table 38 (e.g., if the currently-active token column is second token column 72, then token $U_x$ would be read from column 72) and searching for the row of the token table 48 having the same active token (e.g., $U_x$) and then copying the inactive token $V_x$ from that row and storing it in the currently-inactive token column of the data table 38 (e.g., first token column 70). In step 535, the token version column 76 or 78 associated with the currently-inactive token column (e.g., first token version column 76 in the case of currently-inactive first token column 70) is updated to store the value from the token version counter 64 (e.g., version 3) to reflect the version of the new token.

It should be noted that although steps 520-535 have been shown and described as occurring sequentially, in some embodiments, steps 520 and 530 may be done in parallel. In such embodiments, after each row of the token table 48 is updated, the rows of the data table 38 that represent the same underlying sensitive data element as the row of the token table 48 that was just updated are updated, and then operation returns back to updating the next row of the token table 48. Upon work on updating any given row of the token table 48 being completed (step 520), the token version field 208, 210 for the active token column is immediately updated (step 525). Similarly, upon work on updating any given row of the data table 38 being completed (step 530), the appropriate token version field 76, 78 of that row is updated (step 535).

It should also be noted that although steps 515, 525, and 535 are described, it may be possible to implement method 500 without these steps. However, such an implementation would be more difficult, as it would require careful coordination of steps 520 and 530 to make sure that each row of the token table 48 is updated contemporaneously with the corresponding rows of the data table 38 and to make sure that the location of the update process within each table 38, 48 is carefully stored so that no row is updated more than once per update.

In addition, in embodiments in which the enhanced token table 248 is used, the first encrypted value column 212 and the second encrypted value column 214 may be periodically re-encrypted in a similar fashion using the current key flag 46 and the key version counter 66. However, since the first encrypted value column 212 and the second encrypted value column 214 do not appear in the data table 38, the re-encryption operation is simpler than the re-tokenization operation of method 500, because no values need to be changed in the data table 38. In addition, the re-encryption operation is considerably less time-intensive, because the size of the token table 148 is typically much smaller than the size of the data table 38. Thus, the re-tokenization, which may be done either on a periodic basis in order to preserve data security in case of an unknown breach or upon initialization by a system administrator in response to information about a specific breach of security, is typically performed more frequently (e.g., once a day or once a week) than the re-tokenization.

Thus, techniques have been described for obscuring a database 38 using two token fields, thereby allowing one inactive token field to be updated while an active token field remains available. A current token flag 44 may be used to indicate which token column is active, allowing a database application 60 to update the other column as processing time permits. In some embodiments, a token version field is also used to allow the database application 60 to keep track of which rows of the database 38 have already been updated.

While various embodiments of the present disclosure have been particularly shown and described, it will be understood by those skilled in the art that various changes in form and details may be made therein without departing from the spirit and scope of the present disclosure as defined by the appended claims.

For example, it should be understood that, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method of securely retrieving and displaying data performed by a computing device, the method comprising:

receiving a request from a user over a user interface, to display one or more rows of data from a data table stored on a remote data server, the one or more rows of data being associated with a sensitive piece of data;

selecting a row of a token table, stored locally at the computing device, the row being uniquely associated with the sensitive piece of data, the token table uniquely associating respective first tokens with respective sensitive pieces of data and uniquely associating respective second tokens with respective sensitive pieces of data;

selecting between a first token column of the token table and a second token column of the token table depending on a value of a current token flag stored in memory of the computing device, the first token column storing a distinct random first token for each row of the token table, the second token column storing a different distinct random second token for each row of the token table, the current token flag defining which of the first token column and the second column is active at any given time;

extracting an active token from the selected one of the first token column and the second token column at the selected row;

sending the extracted active token across a network to the remote data server, the sensitive data not being transmitted over the network;

in response to sending, receiving from the remote data server, via the network, a set of rows of the data table having the extracted active token in a token column of the data table corresponding to the selected one of the first token column and the second token column, the sensitive data not being transmitted over the network;

displaying contents of the received set of rows to the user over the user interface;

switching the value of the current token flag, resulting in a currently-active token column and a currently-inactive token column, the token column that was active prior to switching becoming the currently-inactive token column and a token column that was inactive prior to switching becoming the currently-active token column, wherein the current token flag reflects which of the first token column and the second token column has most recently been completely updated;

after switching, for each row of the token table, randomly generating and storing a new token value in the currently-inactive token column; and after switching, for each row of the data table,
  reading a token value stored in an active token field of that row of the data table;
  selecting a row of the token table having a token value in the currently-active token column the same as the token value read from the active token field; and
  storing the new token value stored in the currently-inactive token column of the token table in an inactive token field of the row of the data table.

2. The method of claim 1 wherein the method further comprises:
  receiving a data row including sensitive data and non-sensitive data;
  creating a new row in the data table;
  searching the token table for a row uniquely associated with the sensitive data;
  if such a row is found in the token table, then storing a third token value from a field of that row and the first token column in a third token column of the new row and storing a fourth token value from a field of that row and the second token column in a fourth token column of the new row and storing the non-sensitive data in a non-sensitive column of the new row; and
  otherwise:
    randomly generating a third token value;
    randomly generating a fourth token value;
    creating a new token row in the token table;
    storing the randomly generated third token value in the first token column of the new token row and storing the randomly generated fourth token value in the second token column of the new token row and storing the sensitive data in a sensitive data column of the new token row; and
    storing the randomly generated third token value in a third token column of the new row and storing the randomly generated fourth token value in a fourth token column of the new row and storing the non-sensitive data in a non-sensitive data column of the new row.

3. The method of claim 1 wherein the method further comprises:
  after switching, incrementing a token version counter;
  upon storing the new token value in the currently-inactive token column of each row of the token table, storing the incremented token version counter in an active token version field of that row of the token table; and
  upon storing the new token value stored in the currently-inactive token column of the token table in an inactive token field of each row of the data table, storing the incremented token version counter in an active token version field of that row of the data table.

4. The method of claim 1 wherein the method further comprises, while the active token column is switched, using the currently-active token column to perform data read operations instead of using the token column that was active prior to switching.

5. The method of claim 1 wherein the method further comprises, upon successfully generating and storing the new token value in the currently-inactive token column of each row of the token table and reading, selecting, and storing for each row of the data table, switching back the value of the current token flag, resulting in the currently-active token column returning to its prior inactive status and the currently-inactive token column returning to its prior active status.

6. The method of claim 5 wherein selecting the row of the token table includes:
  encrypting the sensitive piece of data using a currently-active encryption key with reference to a key version counter stored in memory; and
  searching the token table for a row having an encrypted value column indicated by a current key flag that stores the encrypted sensitive piece of data.

7. The method of claim 6 wherein the method further includes:
  switching an active encrypted value column of the current key flag stored in the memory, resulting in a currently-active encrypted value column and a currently-inactive encrypted value column, the active encrypted value column prior to switching becoming the currently-inactive encrypted value column; and
  after switching the active encrypted value column, incrementing the key version counter;
  after incrementing the key version counter, for each row of the token table, encrypting the sensitive piece of data of that row with a new encryption key associated with a value of the incremented key version counter and storing that newly-encrypted value in the currently-inactive encrypted value column.

8. The method of claim 7 wherein the method further comprises, upon storing the newly-encrypted value in the currently-inactive encrypted value column of each row of the token table, storing the incremented key version counter in an active key version field of that row of the token table.

9. The method of claim 7 wherein the method further comprises, while the active encrypted value column is switched, using the currently-active encrypted value column to perform data read operations instead of using the active encrypted value column prior to switching.

10. The method of claim 7 wherein the method further comprises, upon successfully encrypting and storing the newly-encrypted value in the currently-inactive encrypted value column of each row of the token table, switching the active encrypted value column of the current Key flag [token flag]stored in the memory, resulting in the active encrypted value column returning to its prior inactive status and the inactive encrypted value column returning to its prior active status.

11. The method of claim 1 wherein the current token flag reflects which of the first token column and the second token column has most recently been completely updated.

12. The method of claim 2 wherein the sensitive data column represents usernames and the non-sensitive data column represents login times.

13. The method of claim 2 wherein the non-sensitive data column stores tokens not subject to re-tokenization.

14. The method of claim 1 wherein the sensitive data includes a username.

15. The method of claim 1 wherein (a) randomly generating and storing and (b) storing the new token value in the currently-inactive token column result in re-tokenization of the token table and the data table while data stored within the token table and the data table remain accessible to the user.

16. An apparatus comprising:
a network interface for connecting to a client machine;
a storage network interface for connecting to a remote data server over a storage network, the remote data server storing a data table;
memory, the memory storing:
a token table; and
a current token flag; and
a processor, the processor being configured to perform the following operations:
receiving a request from a user of the client machine over the network interface, to display one or more rows of data from the data table, the one or more rows of data being associated with a sensitive piece of data;
selecting a row of the token table uniquely associated with the sensitive piece of data, the token table uniquely associating respective first tokens with respective sensitive pieces of data and uniquely associating respective second tokens with respective sensitive pieces of data;
selecting between a first token column of the token table and a second token column of the token table depending on a value of a current token flag stored in memory of the computing device, the first token column storing a distinct random first token for each row of the token table, the second token column storing a different distinct random second token for each row of the token table, the current token flag defining which of the first token column and the second column is active at any given time;
extracting an active token from the selected one of the first token column and the second token column at the selected row;
sending the extracted active token across the storage network interface to the remote data server, the sensitive data not being transmitted over the storage network;
in response to sending, receiving from the remote data server, via the storage network interface, a set of rows of the data table having the extracted active token in a token column of the data table corresponding to the selected one of the first token column and the second token column, the sensitive data not being transmitted over the storage network;
displaying contents of the received set of rows to the user over a user interface;
causing, via the network interface, contents of the received set of rows to be displayed to the user at the user interface of the client machine;
switching the value of the current token flag stored in the memory, resulting in a currently-active token column and a currently-inactive token column, the token column that was active prior to switching becoming the currently-inactive token column and a token column that was inactive prior to switching becoming the currently-active token column, wherein the current token flag reflects which of the first token column and the second token column has most recently been completely updated;
after switching, for each row of the token table, randomly generating and storing a new token value in the currently-inactive token column; and
after switching, for each row of the data table,
reading a token value stored in an active token field of that row of the data table;
selecting a row of the token table having a token value in the currently-active token column the same as the token value read from the active token field; and
storing the new token value stored in the currently-inactive token column of the token table in an inactive token field of the row of the data table.

17. The apparatus of claim 16 wherein the processor is further configured to perform the following operations:
receiving a data row over the network interface from the client machine including sensitive data and non-sensitive data;
creating a new row in the data table;
searching the token table for a row uniquely associated with the sensitive data;
if such a row is found in the token table, then storing a third token value from a field of that row and the first token column in a third token column of the new row and storing a fourth token value from a field of that row and the second token column in a fourth token column of the new row and storing the non-sensitive data in a non-sensitive column of the new row; and
otherwise:
randomly generating a third token value;
randomly generating a fourth token value;
creating a new token row in the token table;
storing the randomly generated third token value in the first token column of the new token row and storing the randomly generated fourth token value in the second token column of the new token row and storing the sensitive data in a sensitive data column of the new token row; and
storing the randomly generated third token value in a third token column of the new row and storing the randomly generated fourth token value in a fourth token column of the new row and storing the non-sensitive data in a non-sensitive data column of the new row.

18. The apparatus of claim 16 wherein the processor is further configured to perform the following operations:
after switching, incrementing a token version counter stored in the memory;

upon storing the new token value in the currently-inactive token column of each row of the token table, storing the incremented token version counter in an active token version field of that row of the token table; and upon storing the new token value stored in the currently-inactive token column of the token table in an inactive token field of each row of the data table, storing the incremented token version counter in an active token version field of that row of the data table.

* * * * *